(12) United States Patent
Ghode et al.

(10) Patent No.: US 8,766,567 B2
(45) Date of Patent: Jul. 1, 2014

(54) BATTERY CONTROL AND PROTECTIVE ELEMENT VALIDATION METHOD

(75) Inventors: Anil P. Ghode, Libertyville, IL (US);
Thomas P. Becker, Kenosha, WI (US);
Donald Herres, Fayetteville, NY (US)

(73) Assignee: Snap-on Incorporated, Kenosha, WI (US)

( * ) Notice: Subject to any disclaimer, the term of this patent is extended or adjusted under 35 U.S.C. 154(b) by 132 days.

(21) Appl. No.: 13/565,391

(22) Filed: Aug. 2, 2012

(65) Prior Publication Data

US 2014/0035489 A1 Feb. 6, 2014

(51) Int. Cl.
*H02P 1/00* (2006.01)
*H02P 5/74* (2006.01)

(52) U.S. Cl.
CPC .................................... *H02P 5/74* (2013.01)
USPC ............................. 318/139; 318/34; 318/255

(58) Field of Classification Search
CPC .............................. Y02T 10/7005; H02P 5/74
USPC ............................................ 318/139, 34, 255
See application file for complete search history.

(56) References Cited

U.S. PATENT DOCUMENTS

| | | | |
|---|---|---|---|
| 4,194,146 A | 3/1980 | Patry et al. | |
| 5,357,203 A | 10/1994 | Landau et al. | |
| 5,426,589 A | 6/1995 | Kitagawa et al. | |
| 5,432,427 A | 7/1995 | Chiang | |
| 5,889,386 A | 3/1999 | Koenck | |
| 6,043,630 A | 3/2000 | Koenck et al. | |
| 6,437,540 B2 | 8/2002 | Sonobe | |
| 6,481,406 B2 | 11/2002 | Pels | |
| 7,164,257 B2 | 1/2007 | Johnson et al. | |
| 7,176,654 B2 | 2/2007 | Meyer et al. | |
| 7,208,916 B1 | 4/2007 | Boatwright et al. | |
| 7,262,580 B2 | 8/2007 | Meyer et al. | |
| 7,323,847 B2 | 1/2008 | Meyer et al. | |
| 7,389,806 B2 * | 6/2008 | Kates ................................ 160/5 |
| 7,411,494 B2 * | 8/2008 | Kates ....................... 340/539.22 |
| 7,425,816 B2 | 9/2008 | Meyer et al. | |
| 7,486,049 B2 | 2/2009 | Wan | |
| 7,501,797 B2 | 3/2009 | Satoh et al. | |
| 7,504,804 B2 | 3/2009 | Johnson et al. | |
| 7,508,167 B2 | 3/2009 | Meyer et al. | |
| 7,508,171 B2 | 3/2009 | Carrier et al. | |

(Continued)

FOREIGN PATENT DOCUMENTS

EP    1796243 A2    6/2007

OTHER PUBLICATIONS

International Search Report and Written Opinion of International Searching Authority dated Nov. 7, 2013 of Applicant's corresponding PCT application.

*Primary Examiner* — David Luo
(74) *Attorney, Agent, or Firm* — Seyfarth Shaw LLP

(57) ABSTRACT

A method, system and device for discharging power or validating protective elements of a power source to ensure proper functioning of a tool at various temperatures. The power source communicates with a switch using handshake signals to establish a scheme for power distribution depending on the temperature of the power source. The power source can discharge power at a normal start-up rate or a slower start-up rate depending on the temperature of the power source. Handshake signals can also be used to validate protective elements, where the protective elements respond to wake-up signals with respective handshake signals indicating that the protective elements are functioning property.

19 Claims, 5 Drawing Sheets

(56) References Cited

U.S. PATENT DOCUMENTS

| | | |
|---|---|---|
| 7,564,216 B2 | 7/2009 | Carrier et al. |
| 7,629,770 B2 | 12/2009 | Iida et al. |
| 7,667,437 B2 | 2/2010 | Johnson et al. |
| 7,723,961 B2 | 5/2010 | Cobianu et al. |
| 7,737,655 B1 | 6/2010 | Devaney et al. |
| 7,821,214 B2 | 10/2010 | Yaguchi |
| 7,868,591 B2 | 1/2011 | Phillips et al. |
| 7,944,173 B2 | 5/2011 | Johnson et al. |
| 7,977,917 B2 | 7/2011 | Asada |
| 7,986,130 B2 | 7/2011 | Yen |
| 7,990,100 B2 | 8/2011 | Kubota et al. |
| 7,990,109 B2 | 8/2011 | White et al. |
| 7,999,510 B2 | 8/2011 | Johnson et al. |
| 8,018,198 B2 | 9/2011 | Meyer et al. |
| 8,033,479 B2 * | 10/2011 | Kates ............ 236/1 B |
| 8,035,346 B2 | 10/2011 | Tsai |
| 8,058,846 B2 | 11/2011 | Kim |
| 2004/0070371 A1 | 4/2004 | Chern et al. |
| 2005/0073282 A1 | 4/2005 | Carrier et al. |
| 2008/0149407 A1 | 6/2008 | Shibata et al. |
| 2009/0015206 A1 | 1/2009 | Seman, Jr. et al. |
| 2009/0051325 A1 | 2/2009 | Chorian et al. |
| 2009/0091297 A1 | 4/2009 | Ishikawa et al. |
| 2009/0230923 A1 | 9/2009 | Hoffman et al. |
| 2010/0063757 A1 | 3/2010 | Suzuki |
| 2010/0084150 A1 | 4/2010 | Suzuki et al. |
| 2010/0181966 A1 | 7/2010 | Sakakibara |
| 2010/0264877 A1 | 10/2010 | Ashida |
| 2011/0109274 A1 | 5/2011 | Minamiura |
| 2011/0163723 A1 | 7/2011 | Tan et al. |
| 2011/0199053 A1 | 8/2011 | Minamiura |
| 2011/0266868 A1 | 11/2011 | Yamamoto et al. |
| 2011/0313613 A1 | 12/2011 | Kawahara et al. |

* cited by examiner

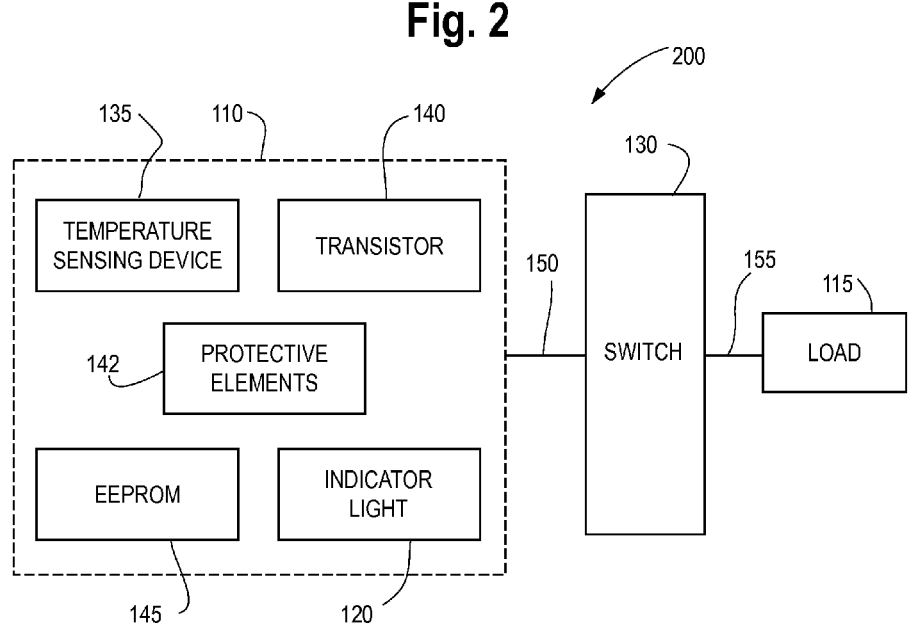

US 8,766,567 B2

BATTERY CONTROL AND PROTECTIVE ELEMENT VALIDATION METHOD

TECHNICAL FIELD OF THE INVENTION

The present application relates generally to controlling the distribution of power from a power source and the validation of protective elements for the power source. Particularly, the present application relates to selectively discharging power or validating protective elements in a power source, such as a battery, with a handshake based on the temperature of the power source.

BACKGROUND OF THE INVENTION

Cordless tools are typically powered by lithium-ion (Li-ion) or other types of batteries that supply power to a motor when a trigger is depressed. For example, a user of a power drill can engage a trigger and supply power to the drill motor based on the amount that the trigger is actuated. Cordless took have become a versatile way of interacting with workpieces without exerting a large amount of manual effort.

However, the versatility of cordless took can be limited by temperatures the tools are used. Tools in general are used in all types of weather and temperatures, and cordless tools are no exception. For example, cold temperatures can limit the efficacy of a cordless tool by creating a high surge current and voltage drop, which can cause the tool to shut down because of protective elements in the tool's power source.

The protective elements discussed above are an important aspect of protecting the power source and tool from electrical damage due to high surge currents and voltage drops. These protective elements can malfunction, however, causing damage to the tool.

SUMMARY OF THE INVENTION

The present application discloses method, system and device for selectively discharging power from a power source, such as, for example, a battery at a rate depending on the temperature of the power source. The power source and switch are adapted to communicate with each other using handshake signals to determine the appropriate power distribution method. For example, depending on the handshake signal outcome, power can be discharged at a normal start-up rate or a slower start-up rate based on the sensed temperature of the power source. Protective elements in the power source can also be validated based on the handshake signal to ensure the protective elements are functioning properly before discharging power from the power source to protect the power source.

For example, the present application discloses a method for controlling output of power sources, such as, for example, a battery, including determining a temperature of the power source, selecting a handshake signal to be sent to the switch based on the temperature of the power source, transmitting the handshake signal to the switch, establishing a power distribution scheme depending on the outcome of the handshake signal, and allowing a distribution of power from the power source in accordance with the power distribution scheme.

Also disclosed is a method of validating an element that performs a function, the method including transmitting a wake-up signal to the element, receiving a handshake signal indicating that the element is performing the function, and allowing power to be distributed from a power source to a load upon receipt of the handshake signal.

In addition, the present application discloses a method of validating a charger adapted to charge a power source having a power source parameter, the method including transmitting a wake up signal to the power source, receiving a handshake signal from the power source indicating that the power source parameter is sufficient so the power source can be charged by the charger, and charging the power source.

An apparatus for controlling power distribution is also disclosed and includes a power source, a switch coupled to the power source and adapted to transmit and inhibit a flow of power from the power source, a load coupled to the power source and adapted to receive the power, a power distribution system including a temperature sensing device adapted to sense a temperature of the power source, and a transistor coupled to the temperature sensing device, the transistor adapted to control transmission of power from the power source to the motor based on a handshake signal transmitted from the power distribution system indicating the temperature.

BRIEF DESCRIPTION OF THE DRAWINGS

For purpose of facilitating an understanding of the subject matter sought to be protected, there are illustrated in the accompanying drawings embodiments thereof from an inspection of which, when considered in connection with the following description, the subject matter sought to be protected, its construction and operation, and many of its advantages should be readily understood and appreciated.

FIG. 2 is a schematic diagram of an embodiment of the battery control system according to the present invention.

Figure 1:
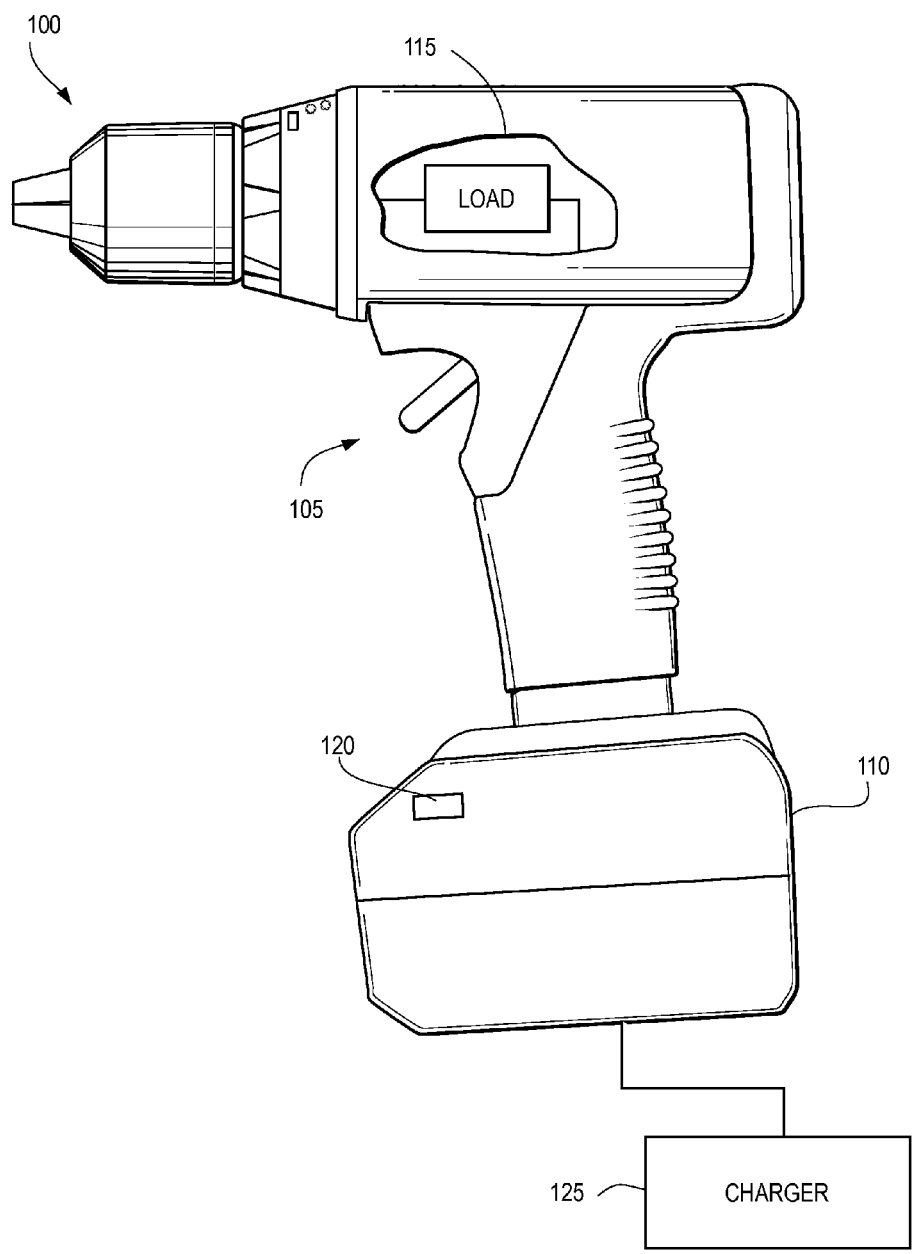
FIG. 1 is a side view of a tool and a schematic illustration of a charger according to an embodiment of the present invention.

It should be understood that the comments included in the notes as well as the materials, dimensions and tolerances discussed therein are simply proposals such that one skilled in the art would be able to modify the proposals within the scope of the present application.

DETAILED DESCRIPTION OF THE EMBODIMENTS

While the present invention is susceptible of embodiments in many different forms, there is shown in the drawings, and will herein be described embodiments of the invention with the understanding that the present disclosure is to be considered an exemplification of the principles of the invention, and is not intended to limit the broad aspect of the invention to the embodiments illustrated.

The present invention relates to a method, system and device for controlling from a power source power or validating protective elements of a power source, such as, for example, a battery to ensure proper functioning of the power source at various temperatures. The power source can communicate with a switch, such as with a hand shake signal, to determine the appropriate scheme for power distribution depending on the temperature or other conditions of the power source. The power source can discharge power at a normal start-up rate or a slower start-up rate depending on the temperature and/or condition of the power source. Handshake signals can also be used to validate protective elements adapted to protect the power source and/or tool from damage, where the protective elements respond to a wake-up signal with a respective handshake signal indicating that the protective elements are functioning properly.

As shown in FIG. 1, an embodiment of the present invention includes a tool 100 having a trigger 105 adapted to facilitate the transfer of power from a power source 110 to a load 115, such as a tool motor. Coupled to the power source 110 can be an indicator 120, such as a light adapted to illuminate when the power source 110 is being charged or when the power source 110 is discharging power to the load 115, or any other condition of the power source 110. A charger 125 can be used to charge the power source 110 when the power source 110 requires charging.

As shown, the tool 100 can be a power drill. However, any power tool can utilize the system of the present application to selectively control the transfer of power. For example, the tool 100 can be an electric or pneumatic hammer, power saw, glue gun, snow or leaf blower, lawn mower, or any other tool that can be operated through a power source.

The trigger 105 is adapted to be actuated by a user to effectuate the amount of power delivered to the load 115. For example, a user can apply a force to the trigger 105 to apply a variable amount of power from the power source 110 to the load 115. The more the user engages and depresses the trigger 105, the more power that is delivered to the load 115. The present invention is not limited to a depressable trigger 105, however, and can include a button, power control wheel, ball bearing design, or any other interface that allows a user to control power flow from a power source to a load.

The power source 110 can be any type of device that stores or creates power, including a battery, alternator, capacitive element, supercapacitor, fuel cell, generator, or any other power source. For the purposes of discussion only, the power source 110 will be described as a battery.

The load 115 can be any device or electrical component adapted to utilize power from the power source 110. For example, the load 115 can be a motor, heating device, electrical resistor, or any other device. For purposes of discussion only, the load 115 will be described as a motor.

The indicator light 120 is adapted to indicate to a user when the power source 110 is charging, discharging power or other conditions of the power source. For example, the indicator light 120 can be a light emitting diode (LED) that illuminates in a green color when the power source 110 is charging, and illuminates in a red color when the power source 110 is discharging. Alternately, the indicator light 120 can illuminate in only one color. Also, other forms of indication can be used without departing from the spirit and scope of the present invention, such as, for example, a tactile or audible response.

The charger 125 can be any device that provides power to the power source 110. For the purposes of discussion, the charger 125 is a battery charger.

FIG. 2 illustrates a power distribution system 200 in accordance with an embodiment of the present application. As shown, the power distribution system 200 includes a power source 110, a switch 130, and a load 115. The power source 110 can include a temperature sensing device 135 adapted to sense a temperature of the power source 110, a transistor 140 adapted to control the amount of power from the power source 110 to the switch 130 or the load 115, and the indicator light 120 discussed above. The power source 110 can also include a volatile memory, such as an electronically erasable programmable read-only memory (EEPROM) 145, that can contain data or computer program instructions that facilitate the transmission of power from the power source 110 to the switch 130 and/or the load 115. The power source 110 can include protective elements 142 that perform protective functions for the power source 110, e.g., turning the power source off when a voltage drop or current surge reaches a predetermined level.

The transistor 140 controls the various signals sent from the power supply 110 to the switch 130 to facilitate the transmission of the signals as, for example, a logical high (e.g., an open circuit) when the power supply 110 is outside of normal operating parameters, or a logical low (e.g., a ground potential) when the power source 110 is within normal operating parameters. For the purposes of discussion, the transistor 140 is a metal oxide semiconductor field effect transistor (MOSFET), although any type of transistor 140 can be utilized without departing from the spirit and scope of the present invention. The transistor 140 can allow a full, unimpeded transmission of power when transmitting a logical low signal, and can impede or completely prohibit the transmission of power when transmitting a logical high signal. Any other variation of signals transmitted by the power source 110 via the transistor 140 can be implemented without departing from the spirit and scope of the present application.

The temperature sensing device 135 can be any device or circuitry capable of determining a temperature of the power source 110 and allowing that temperature to be communicated to either the switch 130 and/or the load 115. For example, the temperature sensing device 135 can be a thermometer or circuitry adapted to sense the temperature of the power supply 110 due to variations in circuit parameters caused by fluctuating temperatures.

The power source 110 can be operably coupled to the switch 130 via one or more terminal connection 150. The switch 130, in turn, can be operably coupled to the load 155 via one or more power output connection 155. Each of these connections 150, 155 can include a positive and negative terminal, as well as several additional terminal connections that facilitate the flow of power from the power source 110 to the load 115. For example, as shown in FIGS. 3A-5, the connections 150, 155 can include terminal connections that read the EEPROM 145, supply power to the load 115 or the indicator light 120, turn the switch 130 off to protect the power source 110, and initiate wake-up or handshake signals between the power source 110 and the switch 130 and/or load 115. Any additional terminal contacts can be included between the power source 110, switch 130 and load 115 without departing from the spirit and scope of the present application.

Figure 3A:
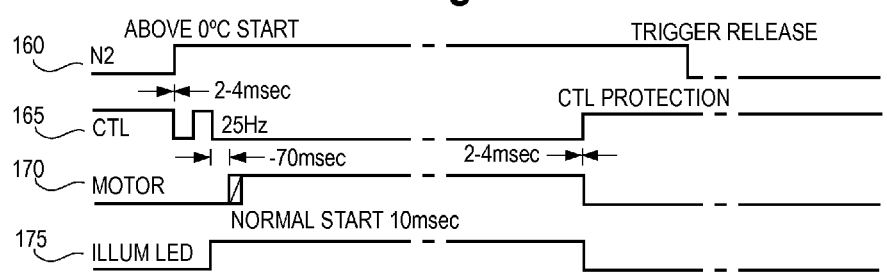
FIGS. 3A and 3B are schematic illustrations of transmitted signals that effect a power source control method according to an embodiment of the present invention.
Figure 3B:
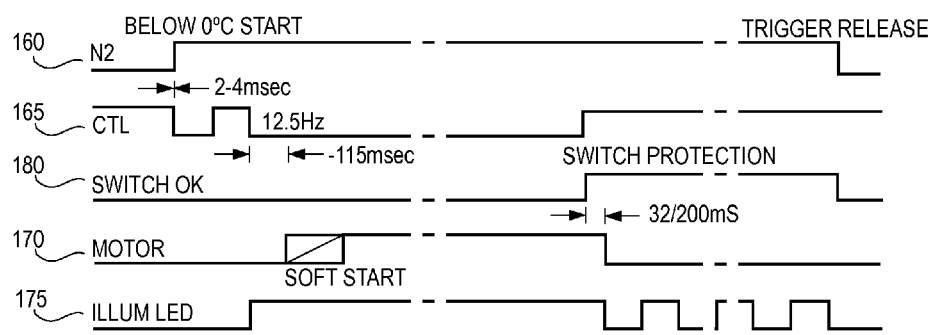

FIGS. 3A and 3B illustrate different exemplary start rates for the load 115 (indicated as a motor in FIGS. 3A and 3B). The start rate is determined based on the signal(s) received from the power source 110 at the switch 130 and/or the load 115. For example, FIGS. 3A and 3B illustrate a N2 signal 160, a control (CTL) signal 165, a motor signal 170, and an indicator light signal 175 that communicate information from the power source 110 to/from the switch 130 and/or the load 115. A switch signal 180 can also be provided to enable the switch 130 to enter a protection mode if the control signal 165 instructs the switch signal 180 to do so. FIG. 3A illustrates the start up rate of the load 115 when the temperature of the power source 110 is at or above a certain temperature, such as, for example, 0° C., and FIG. 3B illustrates the start up rate of the load 115 when the temperature of the power source 110 is below a certain temperature, such as, for example, 0° C.

As shown in FIGS. 3A and 3B, an exemplary system 200 can start the load 115 at a first start rate or a second start rate, depending on the handshake signal transmitted by the power source 110. For example, FIG. 3A shows a handshake signal initiated by the control signal 165 that starts high, then moves low, then high, then low again. The spacing of the high-low portions of the signal indicates whether the power source 110 is operating at or above a specific parameter, in this case the 0° C. temperature mark. As shown in FIG. 3A, the handshake signal from the control signal 165 is initiated at a higher frequency, such as, for example, 25 Hz, as opposed to the handshake signal when the power source 110 is below 0° C., where the signal is initiated at 12.5 Hz. The handshake signal in FIG. 3B therefore instructs the load 115 to enter a "soft start" where start rate of the load 115 is slower than the normal start rate illustrated in FIG. 3A. Of course, the above process is only an example, and any other process for selectively controlling battery output based on temperature sensing can be performed without departing from the spirit and scope of the present invention.

Utilizing the above process, the load 115 can operate more efficiently and effectively by starting the load 115 at a lower rate when temperature would affect the operation of the load 115 if initiated at the normal higher rate. The load 115 can thus selectively draw power from the power source 110 depending on the handshake signal transmitted by the control signal 165. Accordingly, the tool 100 can operate more efficiently and at a temperature where the tool 100 would not otherwise operate at a high level.

Figure 4:
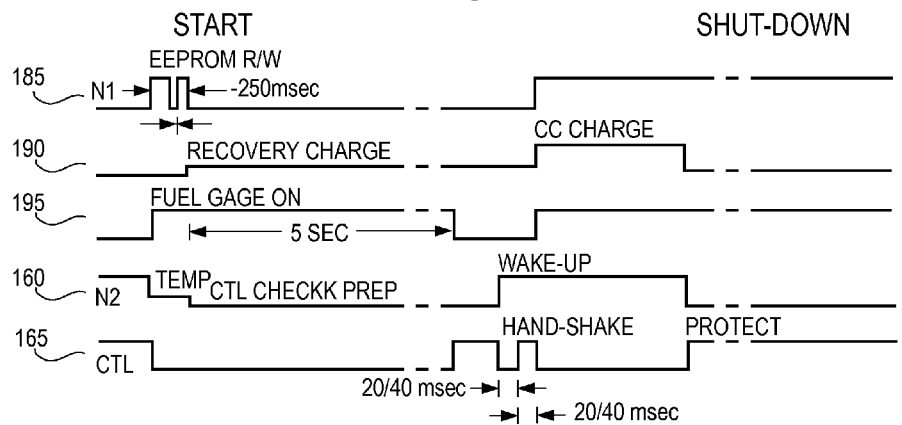
FIG. 4 is a schematic illustration of transmitted signals in accordance with a power source charging method of the present invention.

FIG. 4 illustrates a schematic diagram detailing handshake signals between the power source 110 and the charger 125. As shown, the signals in FIG. 4 can include an EEPROM read signal 185, a charge signal 190 and a fuel gage signal 195, in addition to the signals discussed above with respect to FIGS. 3A and 3B. The system of FIG. 4 validates the various contacts between the power source 110 and the charger 125 and validates different parameters of the power source 110 to instruct the charger 125 to charge the power source 110.

As shown, the wake-up 160 signal from the charger 125 will request a handshake signal from the power source 110 in a manner similar as discussed above with respect to FIGS. 3A and 3B. In response, the power source 110 will provide the handshake signal to the charger 125. Once the handshake response is received from the power source 110 by the charger 125, the charger 125 can then supply charge or other replenishing means to the power source 110 to charge the power source 110. A subsequent high control signal 160 will instruct the charger 125 to end the charging process.

The above process validates the connection between the charger 125 and the power source 110 by determining whether parameters of the power source 110 are sufficient to begin the charging process. For example, the charger 125 will not initiate a charging operation until the charger 125 receives the necessary low, high, low handshake signal from the power source 110. The handshake signal can also vary in frequency, similar to the system discussed above with respect to FIGS. 3A and 3B, to achieve different start-up charging rates for the power source 110. The power source 110 can thus be charged at sufficient operating parameters, or when such parameters do not exist, the user can be notified so the power source 110 is not damaged.

Figure 5:
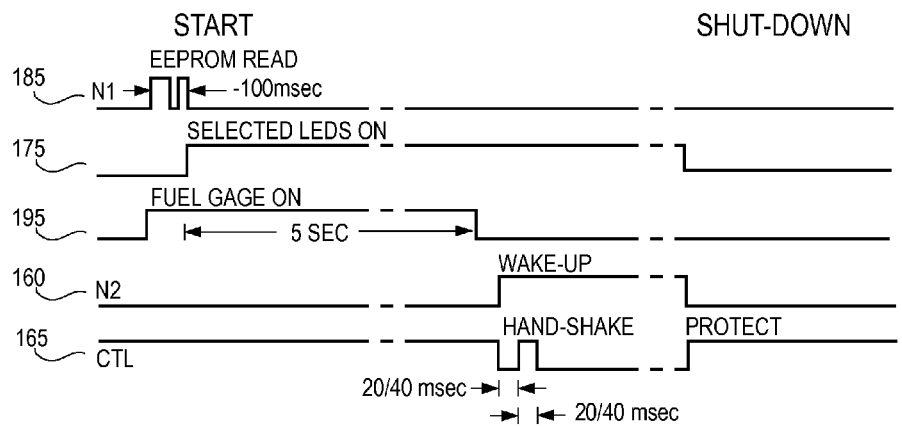
FIG. 5 illustrates a schematic illustration of transmitted signals in accordance with a protective element validation system according to an embodiment of the present invention.

FIG. 5 illustrates a signal system where handshake signals can be used to validate protective elements 142 of a power source 110 as applied to an accessory load, for example an LED work light. As shown, the EEPROM of the power source 110 is read by the EEPROM read signal 185 to initiate the process. The work light can then be actuated immediately by the indicator light signal 175 and, at a later stage, a wake up signal can be sent to the power source 110 by the N2 signal 160. In response, a handshake signal can be sent from the power source 110 to the switch 130 and/or the load 115 to ensure that the protective elements 142 of the power source 110 are functioning properly. Should the control signal 165 revert back to the high level, the protective elements 142 can then perform their intended function and shut down the power source discharge function, thereby protecting the power source 110.

The above process allows the protective elements 142 to be validated during the discharge of power from the power source 110. Following validation, the user can continue to draw power from the power source 110 only while the protective elements 142 are functioning properly, and will not be able to draw power from the power source 110 when the protective elements 142 have failed. Using this unique handshake communication method, a user is less likely to harm a power source 110 during the normal course of operating the accessory tool.

Figure 6:
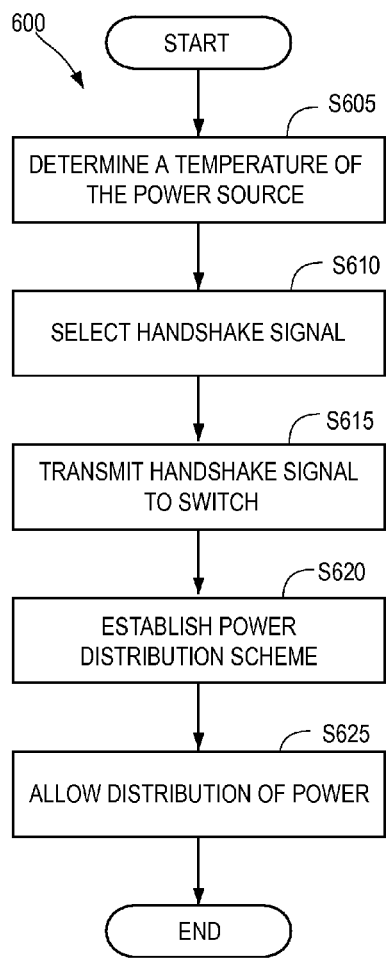
FIG. 6 is a flowchart illustrating a process for distributing power in accordance with an embodiment of the present application.
Figure 7:
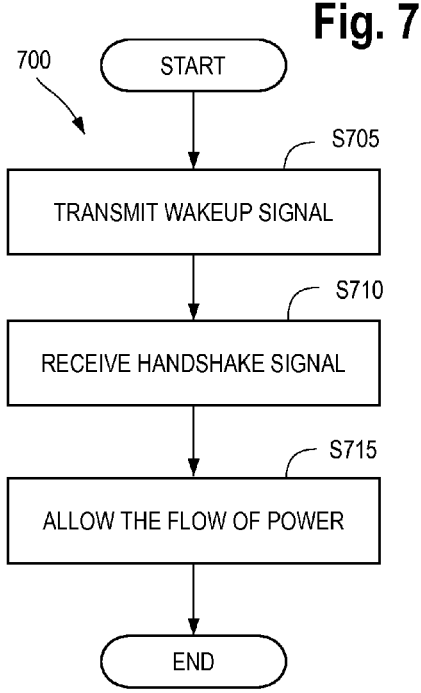
FIG. 7 is a flowchart illustrating a process for validating protective elements in accordance with an embodiment of the present application.
Figure 8:
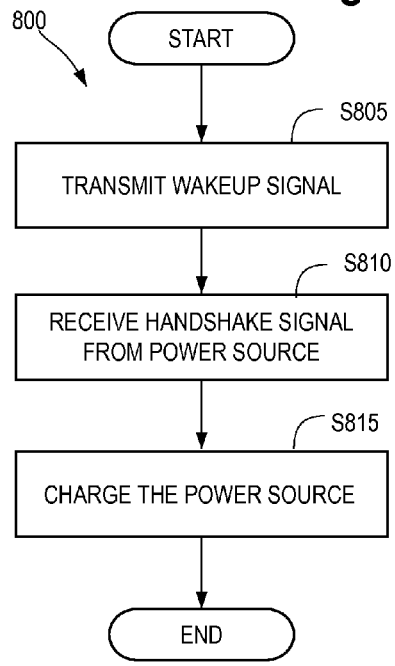
FIG. 8 is a flowchart illustrating a process for validating a charging process according to an embodiment of the present application.

FIGS. 6-8 illustrate various methods in accordance with embodiments of the present application. As shown in FIG. 6, the process 600 begins and proceeds to step S605, where a temperature of the power source 110 is determined by a temperature sensing device 135. Depending on the temperature, a handshake signal is selected at the power source S610 and then transmitted to the switch S615 to communicate the temperature of the power source 110 to the switch 130 and/or the load 115. A power distribution scheme is then determined S620 in which power is distributed from the power source 110 at a first rate or a second rate lower than the first rate depending on the transmitted handshake signal. Of course, any number of handshake signals and corresponding power distribution schemes can be implemented without departing from the spirit and scope of the present application. Once the power distribution scheme is determined S620, power is transmitted to the load 115 at S625 in accordance with the power distribution scheme.

FIG. 7 illustrates a process 700 for validating the protective elements 142 of the power source 110 in accordance with an embodiment of the present application. As shown, a wake-up signal is transmitted to the power source 110 at S705, and a handshake signal is received S710 based on the transmitted wake-up signal. Once the switch 130 and/or load 115 receives the handshake signal, the transistor 140 can allow the flow of power from the power source 110 to the load 115 at S715.

FIG. 8 illustrates a process 800 for charging a power source 110 in accordance with an embodiment of the present application. As shown, a wake up signal is transmitted to the power source S805 and a handshake signal is received from the power source 110 at S810, indicating that the power source 110 is operating at parameters appropriate for charging. For example, at S810, the power source 110 can transmit a handshake signal indicating that the temperature of the power source 110 is above a predetermined temperature so that charging the power source 110 is safe and efficient. Once the handshake signal is transmitted to the charger, the power source 110 is charged at S815.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A method for controlling output of a power source, comprising:
    determining a temperature of the power source;
    selecting a handshake signal to be sent to a switch, wherein the handshake signal is selected based on the temperature;
    transmitting the handshake signal to the switch;
    selecting a power distribution scheme depending on the handshake signal; and
    causing a distribution of an amount of power from the power source in accordance with the power distribution scheme.

2. The method of claim 1, wherein the power distribution scheme includes a first start rate and a second start rate, wherein the first start rate distributes the amount of power at a lower rate compared to the second start rate.

3. The method of claim 2, wherein the step of causing a distribution of an amount of power further includes causing a transistor to at least partially inhibit the amount of power to distribute the amount of power at the first start rate.

4. The method of claim 3, wherein the transistor is a metal oxide semiconductor field effect transistor (MOSFET).

5. The method of claim 1, wherein the first start rate is selected when the temperature is less than a first predetermined amount and the second start rate is selected when the temperature is greater than a second predetermined amount.

6. The method of claim 1, wherein the step of determining a temperature of the power source is performed by temperature sensing circuitry.

7. A method of validating an element that performs a function, the method comprising:
    transmitting a wake-up signal to the element wherein the element permits a flow of power from a power source when performing the function, and wherein the element prohibits the flow of power from the power source when not performing the function;
    receiving a handshake signal indicating that the element is performing the function; and
    causing the distribution of the flow of power to a load only upon receipt of the handshake signal.

8. The method according to claim 7, further comprising reading an electronically erasable programmable read-only memory (EEPROM) prior to the step of receiving the handshake signal and the step of transmitting the wake up signal.

9. A method for validating a charger adapted to charge a power source having a power source parameter, the method comprising:
    transmitting a wake-up signal to the power source;
    receiving a handshake signal from the power source indicating that the power source parameter is sufficient so the power source can be charged by the charger; and
    actuating a switch to establish a power connection between the charger and the power source based on the handshake signal received from the power source; and
    charging the power source with the charger.

10. The method of claim 9, wherein the power source parameter is a temperature of the power source.

11. An apparatus for controlling power distribution comprising:
    a power source;
    a switch operably coupled to the power source and adapted to transmit and control an amount of power from the power source;
    a load operably coupled to the power source and adapted to receive the amount of power; and
    a power distribution system including:
        a temperature sensing device adapted to sense a temperature of the power source; and
        a transistor operably coupled to the temperature sensing device and adapted to allow transmission of the amount of power and control the amount of flow of power from the power source to the switch based on a handshake signal transmitted from the power distribution system indicating the temperature.

12. The apparatus of claim 11, wherein the load is a motor.

13. The apparatus of claim 11, further comprising an EEPROM having a computer program adapted to control the power source.

14. The apparatus of claim 11, wherein the temperature sensing device is circuitry adapted to measure the temperature of the power source.

15. The apparatus of claim 11, further comprising an indicator light adapted to selectively illuminate when the power source is in a discharge mode or a charge mode.

16. The apparatus of claim 11, further comprising a protective element adapted to prohibit transmission of the amount of power from the power source.

17. The apparatus of claim 11, wherein the transistor is a MOSFET.

18. The apparatus of claim 11, wherein the transistor is adapted to permit transmission of the amount of power at a first start rate or a second start rate, wherein the first start rate transmits the amount of power at a lower rate compared to the second start rate.

19. The apparatus of claim 18, wherein the first start rate is initiated when the temperature is less than a first predetermined amount and the second start rate is initiated when the temperature is greater than a second predetermined amount.

\* \* \* \* \*